United States Patent
Evens et al.

(10) Patent No.: US 8,986,479 B2
(45) Date of Patent: Mar. 24, 2015

(54) SYSTEMS AND METHODS FOR ON-AIRCRAFT COMPOSITE REPAIR USING DOUBLE VACUUM DEBULKING

(75) Inventors: Michael W. Evens, Burien, WA (US); Karl Edward Nelson, Shoeline, WA (US); John F. Spalding, Jr., Renton, WA (US); James D. Chanes, Auburn, WA (US); Joel P. Baldwin, Seattle, WA (US); Paul S. Rutherford, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 595 days.

(21) Appl. No.: 12/894,691

(22) Filed: Sep. 30, 2010

(65) Prior Publication Data

US 2012/0080135 A1    Apr. 5, 2012

(51) Int. Cl.
| | | |
|---|---|---|
| B32B 37/10 | (2006.01) | |
| B29C 73/10 | (2006.01) | |
| B29C 73/12 | (2006.01) | |
| B29C 73/30 | (2006.01) | |

(Continued)

(52) U.S. Cl.
CPC .............. B32B 37/1009 (2013.01); B32B 37/10 (2013.01); B29C 2043/3644 (2013.01); B30B 5/02 (2013.01); B30B 9/22 (2013.01); B29C 73/10 (2013.01); B29C 73/12 (2013.01); B29C 73/30 (2013.01); B29C 73/32 (2013.01); B29L 2031/3076 (2013.01)
USPC ............. 156/94; 156/285; 156/286; 156/381; 156/382; 425/389

(58) Field of Classification Search
CPC ............... B29C 2043/3644; B29C 2043/3647; B29C 51/28; B29C 37/1009; B30B 5/02; B30B 9/22; B32B 37/10
USPC ............. 156/94, 285, 286, 381, 382; 425/389
See application file for complete search history.

(56) References Cited

U.S. PATENT DOCUMENTS 4,357,193 A * 11/1982 McGann et al. ............... 156/286
5,442,156 A    8/1995 Westerman et al.

(Continued)

FOREIGN PATENT DOCUMENTS

| DE | 102006001494 B3 | 8/2007 |
|---|---|---|
| DE | 102007026099 A1 | 12/2008 |
| DE | 102008051380 A1 | 4/2010 |

OTHER PUBLICATIONS

International Search Report and Written Opinion of International Searching Authority, PCT/US2011/051496, Mar. 30, 2012.

*Primary Examiner* — Christopher Schatz
(74) *Attorney, Agent, or Firm* — Ostrager Chong Flaherty & Broitman P.C.

(57) ABSTRACT

An in-situ double vacuum debulk (DVD) composite repair system designed to produce partially or fully cured autoclave-quality hot-bond composite repairs on contoured structures. The system provides vacuum pressure for hot bond repairs to be performed on flat and contoured structures using one set-up capable of debulking (partially curing) and then fully curing composite repairs on composite and metallic aircraft structures. The use of in-situ DVD also eliminates handling of the patch/adhesive when transferring from an off-aircraft DVD chamber to the repair site on the aircraft. This can increase the probability of successful repairs because the possibility of contaminating and misaligning the adhesive and repair patch are eliminated.

17 Claims, 5 Drawing Sheets

(51) Int. Cl.
*B29C 43/36* (2006.01)
*B30B 5/02* (2006.01)
*B30B 9/22* (2006.01)
*B29C 73/32* (2006.01)
*B29L 31/30* (2006.01)

(56) References Cited

U.S. PATENT DOCUMENTS

| | | | |
|---|---|---|---|
| 5,958,166 A | 9/1999 | Walters et al. | |
| 6,149,749 A * | 11/2000 | McBroom | 156/94 |
| 6,206,067 B1 | 3/2001 | Kociemba et al. | |
| 6,270,603 B1 | 8/2001 | Westerman et al. | |
| 6,435,242 B1 * | 8/2002 | Reis et al. | 156/382 |
| 6,468,372 B2 * | 10/2002 | Kociemba et al. | 156/71 |
| 6,761,783 B2 | 7/2004 | Keller et al. | |
| 7,137,799 B2 | 11/2006 | Banasky | |
| 2003/0188821 A1 * | 10/2003 | Keller et al. | 156/94 |
| 2006/0191624 A1 | 8/2006 | Whitworth et al. | |
| 2007/0095457 A1 | 5/2007 | Keller et al. | |
| 2008/0308210 A1 | 12/2008 | Keller et al. | |
| 2010/0024958 A1 | 2/2010 | Sawicki et al. | |

* cited by examiner

SYSTEMS AND METHODS FOR ON-AIRCRAFT COMPOSITE REPAIR USING DOUBLE VACUUM DEBULKING

BACKGROUND

This invention generally relates to systems and methods for repairing structures comprised of composite materials, and in particular, to methods and systems for effecting such repairs with limited resources and time. In particular, the invention relates to systems and methods that use double vacuum debulking to repair structural components made of composite material, such as carbon fiber/epoxy composite material.

The use of structures comprised of composite materials has grown in popularity, particularly in such applications as aircraft airframes, where benefits include increased strength and rigidity, reduced weight and reduced parts count. When damaged, however, composite structures often require extensive repair work which may ground an aircraft, thereby adding significantly to the support costs of the aircraft. Current maintenance procedures frequently require that the damaged component be removed and replaced before the aircraft can resume flying.

Commercial airlines today do not have the ability to repair structural damage to an aircraft's composite structures without severely delaying or canceling the aircraft's next flight. Short domestic flights may have only 30-60 minutes of time at the gate whereas longer and international flights may have 60-90 minutes. The Commercial Airline Composite Repair Committee, an international consortium of airlines, OEMs, and suppliers, reports, however, that the average composite repair permitted in the Structural Repair Manuals takes approximately 15 hours to complete. In most cases, flight cancellations occur when a composite repair is performed at the flight line. Removing an airplane from revenue service in order to repair a damaged composite structure costs the operator the labor to repair the structure and adjust its flight schedules, and also causes passenger dissatisfaction.

In addition to the long time required, repairs to composite structures require special skills and equipment in order to properly carry out the repair. Currently, line mechanics do not generally have the training and experience to perform composite repairs, requiring airlines to call out their composite repair technicians from the back shops or heavy maintenance organizations to perform the repairs. These technicians are often located some distance from the airport gate.

Moreover, in conjunction with the lack of training by line mechanics in repairing structural damage, there are restrictions on what equipment and tools are permitted or available at the flight line. This limits the scope of repairs that can be done at the gate. Standard procedures for repairing composite structures require special tools, equipment, and consumable materials. This may include tools for cutting, grinding and drilling; non-destructive inspection equipment; rulers, guides, and templates; electrical heating and vacuum sources and controllers; and an array of vacuum bagging materials. In many situations, the standard hot bonding equipment required for bonded composite repairs is not allowed at the gate due to the potentially explosive conditions that may be present there.

It is known to provide a repair method and system that uses double vacuum debulking (DVD) to repair a composite structure. As used herein, the term "double vacuum debulking" means a process in which a stack of repair plies is subjected to vacuum and mild heating without being compacted by atmospheric pressure. The purpose of the double vacuum debulk process is to minimize porosity in the repair plies by drawing air and other gases from between the plies while they are in an uncompacted state.

The current DVD process for repairing graphite/epoxy primary and secondary structures requires extensive preparation and multiple process steps to perform acceptable composite repairs. The steps required for processing successful composite repairs is very time consuming and labor intensive. Also, processing repairs on contoured surfaces requires fabrication of support mold structure, which also adds significant time and cost to the production of acceptable repair patches. For example, one existing solution requires the composite repair patch to be processed in an off-aircraft chamber to perform debulking (i.e., forming, degassing, consolidating, and staging the repair patch) for subsequent application onto the structure being repaired. More specifically, the current DVD composite repair system is an off-aircraft process using support tooling (i.e., a vacuum box) to provide the first stage of producing a degassed, consolidated composite repair for application onto parent structure. The repairs in this process are produced on either flat or contoured support tooling, and consolidated using the first stage of the DVD process. The processed repair patch is then transferred to the parent aircraft structure and is cured in a second stage process using an adhesive layer in the bondline interface. Flat DVD patches can be fabricated and applied to contoured structure, but when the contour becomes complex or radical, then separate contour matched tooling is required to fabricate the DVD repair.

The set-up for the above-described existing solution involves support mold tooling that allows for the DVD processing to be performed as a separate step. The repair patch is heat bonded to the primary (i.e., parent) structure in need of repair and fully cured in a separate step. Significant processing time, material, and tooling cost savings can be realized if these two separate process steps used in the current DVD repair system could be combined into one set-up on the structure to be repaired.

There is a need for a DVD process in which multiple steps are combined into one set-up. Using such process, the repairs can be completed using the parent structure as a replacement for a forming mandrel for the repair patch consolidation, and the repaired structure can be used for support structure tooling for patch co-cure processing.

Furthermore, metallic structures are sometimes repaired using high-modulus fibers, including carbon and boron materials. The process of repairing metallic structures with composite materials would also benefit from an in-situ DVD process that reduced cycle times for set-up and repair processing.

BRIEF SUMMARY

The invention is an in-situ double vacuum debulk composite repair system designed to produce partially cured or fully cured autoclave-quality hot-bond composite repairs on contoured structures. The invention provides vacuum pressure for hot bond repairs to be performed on flat and contoured structures using one set-up capable of debulking (partially curing) and then fully curing repairs on composite and metallic aircraft structures. [As used herein, the term "partial curing" refers to a state of the impregnated epoxy in a fabric or tape matrix wherein cross-linking of the epoxy is initiated, but not taken to full cure, i.e., to a fully cross-linked stage.]

The use of in-situ DVD also eliminates handling of the patch/adhesive when transferring from an off-aircraft DVD chamber to the repair site on the aircraft. This can increase the probability of successful repairs because the possibility of contaminating and misaligning the adhesive and repair patch are eliminated.

Processing composite repairs on primary structure using the invention allows for the complete process to be performed on contoured structures using one set-up. This new process requires support tooling and equipment that allows the DVD process and cure processing to be completed using simplified processing. The set-up for this invention allows for the composite repair patch to be put immediately into final stage cure processing without having to disrupt the original set-up on the structure. Prior processing of flat and contoured composite structures employed support mold tooling for the DVD portion of the process, and an entirely separate set-up for completing processing on the aircraft structure.

The process disclosed herein allows for one set-up to be used for the entire repair patch processing. No tear down, part transfer, or secondary set-up is required to successfully complete structural repair patch processing. Significant man hour, material, and tooling cost savings can be realized using the new process. There is also a much lower probability of workmanship error or possible introduction of foreign object debris into the repair using the process disclosed herein.

The invention may be implemented using any one of a multiplicity of different structures installed on the repair site. For example, in accordance with one embodiment, the DVD composite repair system comprises solid perimeter standoff extrusions and strongback support tooling which provide a conformable DVD chamber for the first phase of the DVD process on-aircraft. The strongback support tooling may be contoured to match the contour of the structure being repaired. The secondary stage of cure is performed inside a conventional vacuum bag placed immediately over the patch.

In accordance with another embodiment, the DVD composite repair system comprises an inflatable outer bladder attached to strongback support tooling which provide a conformable DVD chamber for the first phase of the DVD process on-aircraft. The secondary stage of cure is performed inside a conventional vacuum bag placed immediately over the patch. or using an inflatable inner bladder attached to strongback support tooling in a manner such that, when the inner bladder is inflated, it exerts pressure on the patch. Using an inflatable inner bladder eliminates the need for the internal vacuum bag system and may provide an additional benefit as a pressure intensifier for repair consolidation. The bladders may be removably attached to any one of a multiplicity of strongback support toolings using hook-and-loop fasteners (e.g., Velcro®), the strongback support toolings having different contours to match the contours of different parent structures. The strongback tool needs to match the contour of the parent structure in order to maintain intimate contact with the outer (i.e., perimeter) bladder.

Additional pressure can be applied to the repair patch by using a compressible solid instead of an inner inflatable bladder. The compressible solid is disposed such that it only contacts the repair patch area. This will concentrate the pressure applied by the strongback support tooling to the much smaller area of the repair patch Each embodiment of the DVD composite repair system disclosed herein further comprises a heat blanket, a thermocouple system, a temperature controller, vacuum control valves and conventional bagging materials. These components are well known in the field of off-aircraft composite repairs and are used in the on-aircraft repair methods disclosed herein in a conventional manner.

This invention makes it possible to produce autoclave-quality repairs directly on flat or contoured aircraft structure using one set-up. This is a clear advantage over the prior art DVD process.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

The invention is an in-situ double vacuum debulk composite repair system designed to produce partially cured or fully cured autoclave-quality hot-bond composite repairs on contoured structures. The invention provides vacuum pressure for hot bond repairs to be performed on flat and contoured structures using one set-up capable of debulking (partially curing) and then fully curing repairs on composite and metallic aircraft structures.

The invention may be implemented using any one of a multiplicity of different structures installed on the repair site. For example, in accordance with one embodiment, the DVD composite repair system comprises solid perimeter standoff extrusions and strongback support tooling which provide a conformable DVD chamber for the first phase of the DVD process on-aircraft. The secondary stage of cure is performed inside a conventional vacuum bag placed immediately over the patch. Such a system is depicted in FIG. 1.

Figure 1:
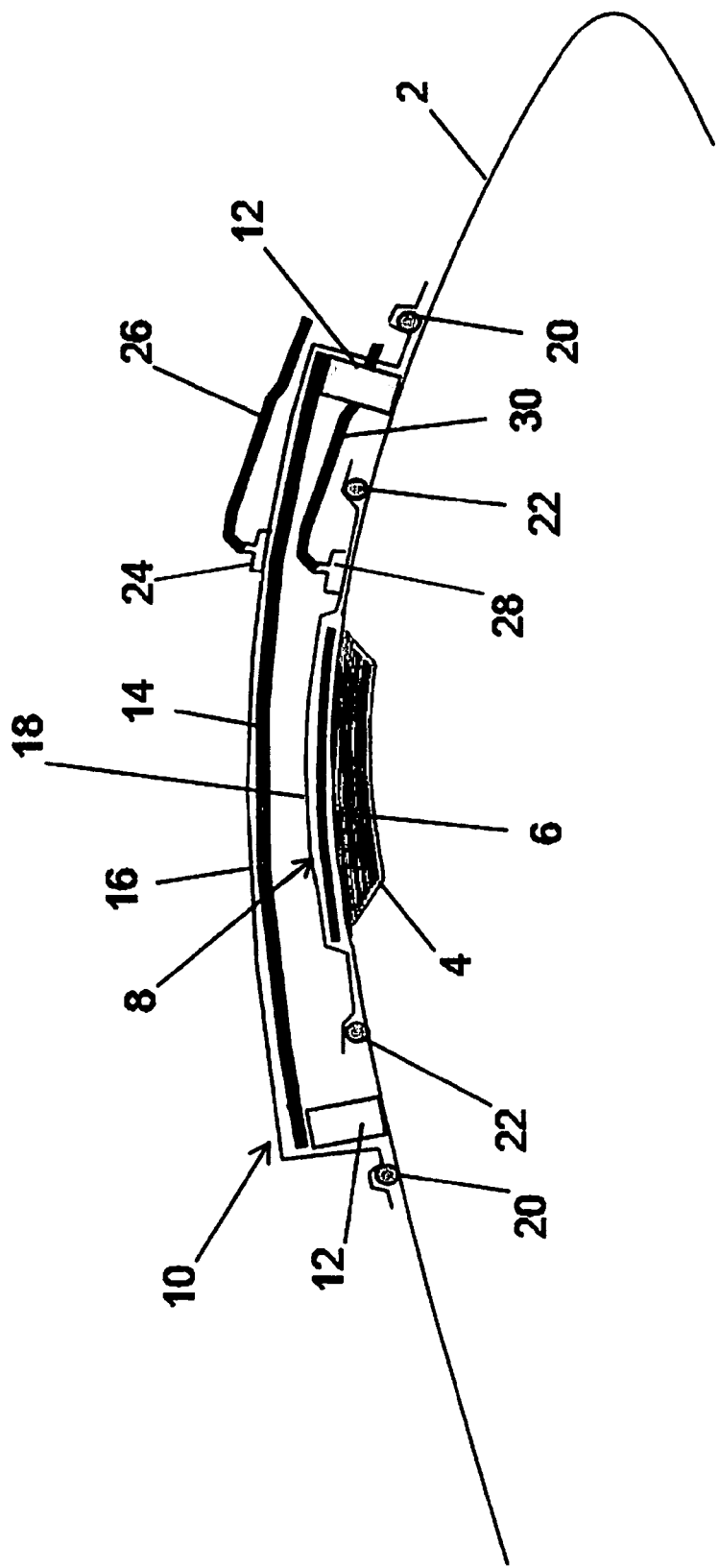
FIG. 1 is a drawing showing a sectional view of a DVD composite repair system in accordance with one embodiment of the invention.

FIG. 1 shows a parent structure 2, which may be part of an aircraft. This parent structure 2 may be made of composite or metallic material. The parent structure 2 has an area 4 which requires repair. In accordance with the invention, the repair will be made using repair plies 6 made of composite material (e.g., carbon or boron fibers embedded in epoxy resin) that will be compacted, debulked and fully cured in situ.

The repair system comprises a DVD lower bag assembly 8 comprising a lower bagging film 18 made, e.g., of nylon, and other elements (described in detail below with reference to FIG. 2) represented in FIG. 1 by a single (unnumbered) bold line. The perimeter of the lower bagging film 18 is sealed to the parent structure 2 by sealing tape 22 which surrounds the repair site 4, thereby defining a lower chamber overlying the repair patch. The lower chamber can be coupled to a vacuum source (not shown) by means of a vacuum probe 28 that passes through an opening in the lower bagging film 18 and is connected to the vacuum source by a hose 30.

The repair system shown in FIG. 1 further comprises a DVD upper bag assembly 10 comprising strongback support tooling 14 supported along its perimeter by a solid silicone standoff or spacer 12 to form a box that covers the lower bagging film 18, and an upper bagging film 16 made, e.g., of nylon, which covers the box. The strongback support tooling 14 is made of stiff material, such as a panel made of honeycomb composite material, and is contoured to generally match the contour of the parent structure in the area of the repair. If the parent structure is flat in the repair area, then the strongback support tooling is preferably flat. The hose 30 to the DVD lower bag assembly 8 may pass through an opening in the spacer 12, as shown is FIG. 1. Alternatively, the hose 30 can pass through an opening in the strongback support tooling 14.

The upper bagging film 16 is sealed to the parent structure 2 by sealing tape 20 which surrounds the spacer 12, thereby defining an upper chamber over and around the lower chamber. The upper chamber can be coupled to a vacuum source (not shown) by means of a vacuum probe 24 that passes through an opening in the upper bagging film 16 and is connected to the vacuum source by a hose 24. Another vacuum probe (not shown in FIG. 1) is coupled to a vacuum gauge (also not shown), which measures the pressure inside the chamber defined by and disposed underneath the upper bagging film 16.

Optionally, a heavy breather cloth can be placed between the upper bagging film 16 and the box formed by strongback support tooling 14 and spacer 12. [As used herein, the term "breather" means a porous material that serves as a continuous air path over or around the part being repaired, but is not in contact with the resin of the composite repair material.] As a further option, a breather cloth may be placed over the lower bagging film 18, this breather cloth extending under and beyond the spacer 12 along its entire perimeter.

Figure 2:
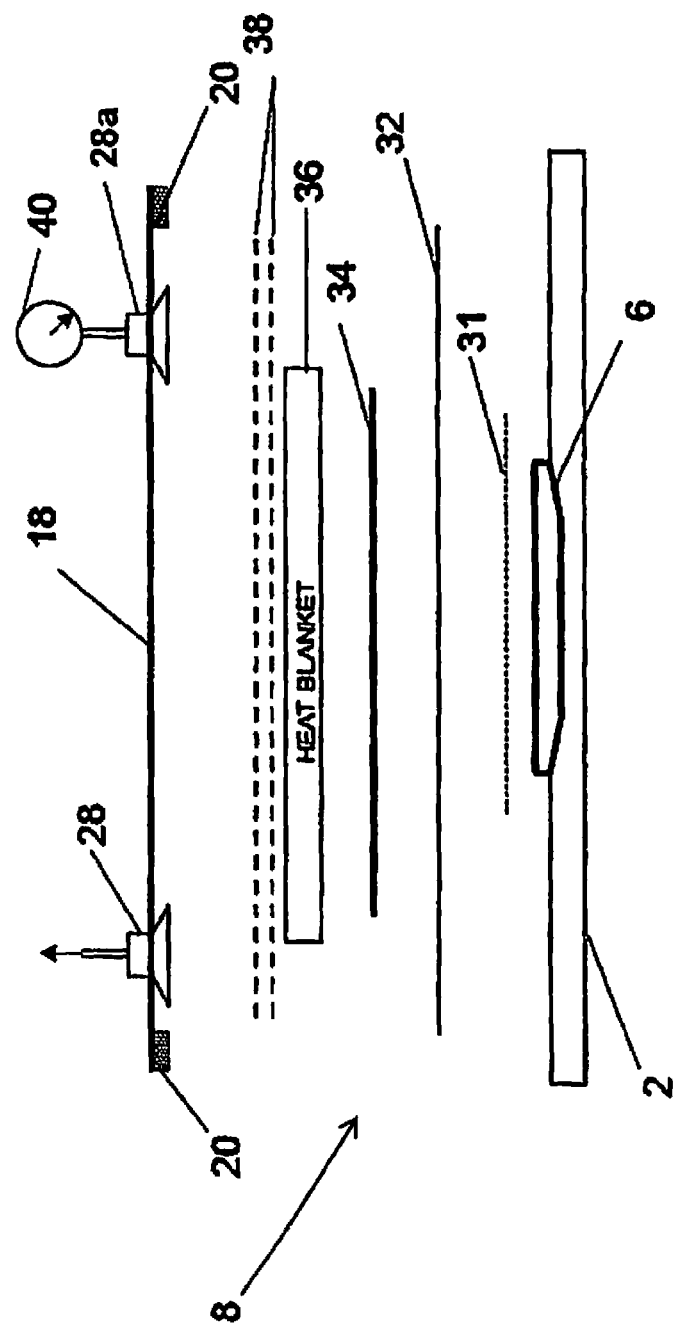
FIG. 2 is a drawing showing an exploded view of a DVD lower bag assembly incorporated in the embodiment depicted in FIG. 1.

The lower bag assembly 8 is shown in detail in FIG. 2. Perforated parting film 31—made, e.g., from fluorinated ethylene propylene (FEP)—is laid over and extends beyond the repair plies 6. Then a ply of bleeder material 32 is laid over and extends beyond the perforated parting film 31. [As used herein, the term "bleeder" means porous material used to remove trapped air and volatiles and to absorb excess resin from prepreg.] The preferred bleeder materials are fiberglass fabric style 7781, 1671 woven E-glass with yarn or polyester woven fabric material. An unperforated parting film 34 is then laid over the bleeder ply 32. An electric heat blanket 36 is then placed on top of the thus-formed stack, with the repair plies 6 separated from the heat blanket 36 by the intervening bleeder ply and separating films. The heat blanket 36 used for the repair should extend beyond the largest repair ply by several inches. The heat blanket 36 is covered by breather plies 38. Then the lower bagging film 18 is placed over the other layers of the lower bag assembly 8 and sealed to the parent structure 2 using sealing tape 20. Two vacuum probes 28 and 28a are installed in respective apertures in the lower bagging film 18. Vacuum probe 28 is coupled to a vacuum source (not shown); vacuum probe 28a is coupled to a vacuum gauge 40, which measures the pressure inside the chamber defined by and disposed underneath the lower bagging film 18.

Figure 3:
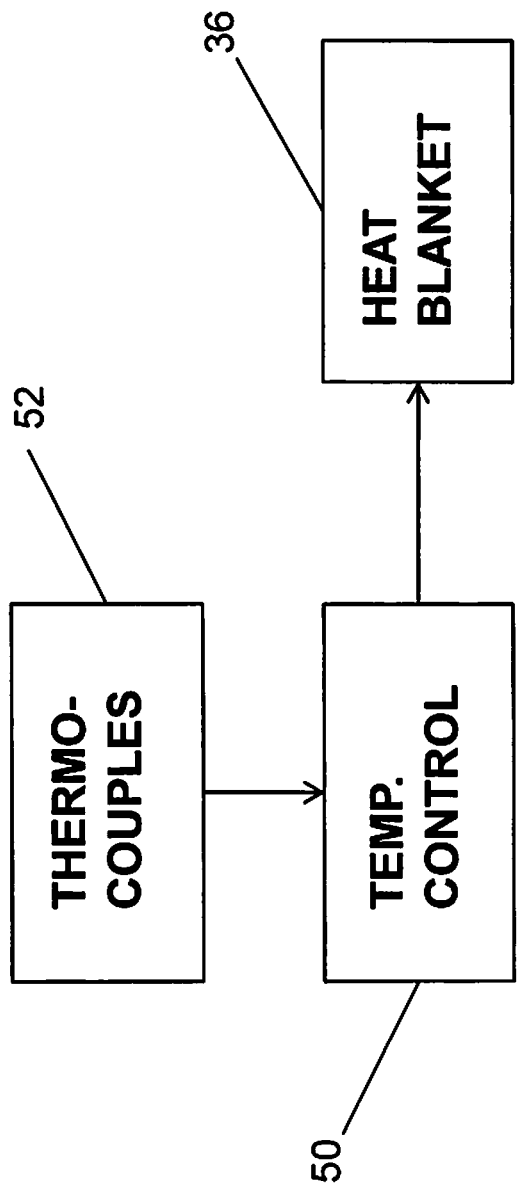
FIG. 3 is a block diagram showing means for controlling temperature incorporated in the embodiments disclosed hereinafter.

Referring to FIG. 3, a temperature controller 50 is connected to the heat blanket 36 and to a plurality (e.g., four) of thermocouples 52. In a well-known manner, the temperature controller 50 can be programmed to control the electrical power being supplied to the electric heat blanket 36 as a function of the temperatures detected by the thermocouples 52 in accordance with a desired temperature cycle.

One embodiment of the process flow for DVD repairs using the apparatus depicted in FIGS. 1-3 comprises the following steps:

(1) remove paint and primer from the defective area 4, plus at least 2 inches on all sides, using fine abrasive;

(2) within 2 inches outside the defective area 4, use fine abrasive to remove paint and surface resin only;

(3) scarf (i.e., sand) the area around the defect to a depth sufficient to clean out the defective material and to prepare a surface for the repair plies;

(4) determine the size, shape and orientation of composite repair plies, make ply templates, and kit plies (the largest repair ply should overlap at least 0.25 inch beyond the periphery of the scarf);

(5) cut and perforate one ply of adhesive (not shown in FIGS. 1 and 2, but disposed between the parent structure 2 and the repair plies 6), e.g., epoxy-based film adhesive MB-1515 (adhesive should extend over the entire scarf area and 0.25 inch beyond the largest repair ply; the perforations will allow trapped air to escape during initial vacuum compaction);

(6) solvent clean the scarfed and sanded surfaces;

(7) apply the perforated adhesive ply to the repair area 4;

(8) place a polyester scrim, a perforated parting film (made, e.g., of fluorinated ethylene propylene (FEP)) and then a ply of breather material (e.g., fiberglass fabric or a polyester mat such as Airweave Super N10 commercially available from Airtech International, Carson Calif.) in sequence over the adhesive ply;

(9) use a temporary vacuum bag (placed over the breather material and sealed to the parent structure along a perimeter surrounding the adhesive) to compact the adhesive under a pressure of 1 atm for a minimum of 10 minutes;

(10) remove the parting film, breather material and temporary vacuum bag (the polyester scrim is not removed and becomes part of the repair);

(11) place the stack of repair plies 6 over the compacted adhesive layer (not shown), locating and orienting plies correctly (i.e., in accordance with design specifications) with regard to fiber direction and location tolerance;

(12) place a polyester scrim, a perforated parting film (e.g., FEP film) and then a ply of breather material (as previously described) in sequence over the repair plies;

(13) use a temporary vacuum bag (placed over the breather material and sealed to the parent structure along a perimeter surrounding the repair plies) to compact the plies under a pressure of 1 atm;

(14) remove the breather material and temporary vacuum bag (the polyester scrim is not removed and becomes part of the repair, while the parting film can be reused as part of the DVD lower bag assembly);

(15) prepare the DVD lower bag assembly 8 as depicted in FIG. 2, including placing four thermocouples (not shown in FIG. 2) around the perimeter of the repair plies to measure temperature;

(16) connect vacuum gauge 40 to vacuum probe 28b and connect a vacuum source (not shown in FIG. 2) to the vacuum probe 28a of the DVD lower bag assembly 8;

(17) prepare the DVD upper bag assembly 10 as depicted in FIG. 1, centering it over the DVD lower bag assembly 8;

(18) connect a vacuum gauge (not shown in FIG. 1) to one vacuum probe (not shown) and a vacuum source (not shown) to the other vacuum probe 24 of the DVD upper bag assembly;

(19) apply a vacuum to both the upper and lower bags, the vacuum on the lower bag being ≥26 inHg and the vacuum on the upper bag being equal to the vacuum on the lower bag +0/−1 inHg;

(20) heat the heat blanket to a soak temperature of 220°±10° F. at a ramp rate of 3°±1° F./min and then subject the part to the soak temperature for a dwell time of 30(±5) minutes;

(21) vent the upper bag when the dwell time has expired while maintaining the soak temperature for another 30(+5/−0) minutes;

(22) for a patch having 35 plies or less, heat the heat blanket from the soak temperature at a ramp rate of 1° to 3° F./min up to a final cure temperature of 350°±15° F., while maintaining the vacuum on the lower bag at ≥26 inHg, and then holding at that temperature and pressure for 150-180 minutes to achieve full cure;

(23) allow the repair site to cool at a rate no greater than 5° F./min;

(24) remove the DVD upper and lower bag assemblies (alternatively, the upper bag assembly could be removed after step (21) and before step (22); and

(25) perform surface finishing as necessary.

Figure 4:
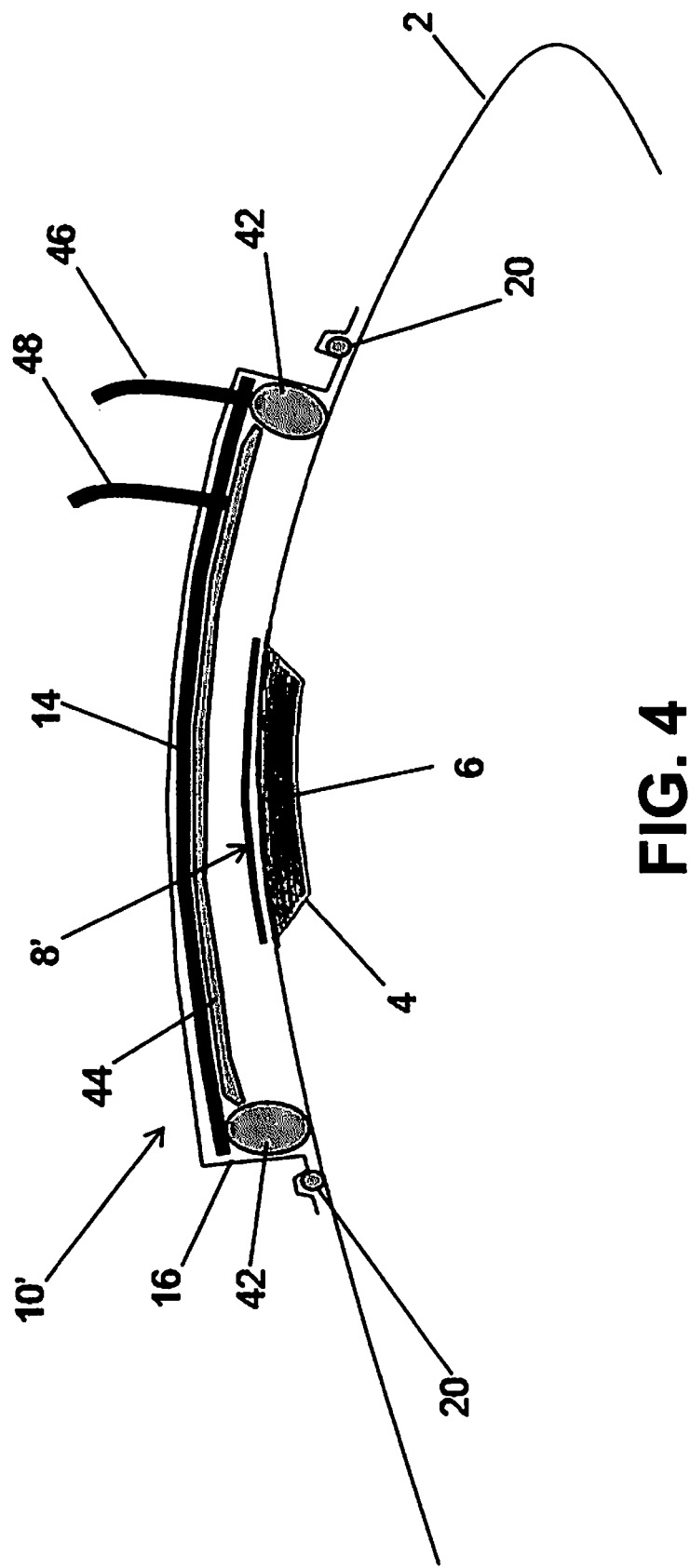
FIG. 4 is a drawing showing a sectional view of a DVD composite repair system in accordance with another embodiment of the invention in a state suitable for the DVD partial cure phase, i.e., with an outer bladder inflated and an inner bladder deflated.
Figure 5:
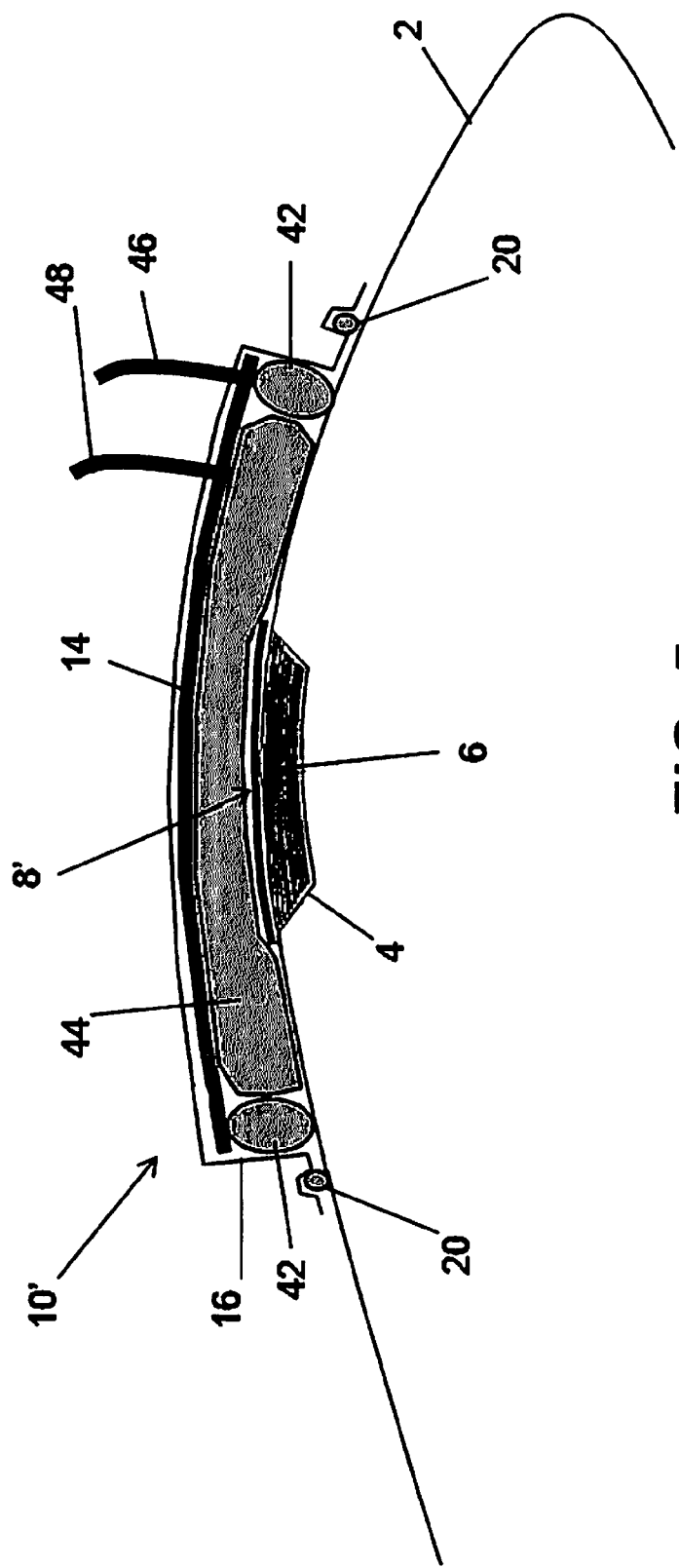
FIG. 5 is a drawing showing a sectional view of a DVD composite repair system in accordance with the embodiment depicted in FIG. 3 in a state suitable for the final cure phase, i.e., with both the inner and outer bladders inflated.

In accordance with another embodiment shown in FIGS. 4 and 5, a DVD upper bag assembly 10' comprises strongback support tooling 14 supported along its perimeter by an inflatable outer bladder 42 (instead of a solid spacer). The DVD upper bag assembly 10' further comprises an inflatable inner bladder 44 disposed inside the outer bladder 42. The inner and outer bladders are removably attached (e.g., by hook-and-loop fasteners) to the strongback support tooling 14.

The strongback support tooling 14 and outer bladder 42 (when inflated) form a structure that encloses the space overlying the repair site. An upper bagging film 16 made, e.g., of nylon, covers the enclosure. The strongback support tooling 14 is made of stiff material, such as a panel made of honeycomb composite material, and is contoured to generally match the contour of the parent structure in the area of the repair. If the parent structure is flat in the repair area, then the strongback support tooling is preferably flat. The strongback tool needs to match the contour of the parent structure in order to maintain intimate contact with the outer (i.e., perimeter) bladder. The strongback support tooling 14 and outer bladder 42 provide a conformable DVD chamber for the first phase of the DVD process on-aircraft.

The upper bagging film 16 is sealed to the parent structure 2 by sealing tape 20 which surrounds the spacer 12. The DVD chamber can be coupled to a vacuum source (not shown) by means of a vacuum probe (not shown in FIGS. 4 and 5) that passes through an opening in the upper bagging film 16 and is connected to the vacuum source by a hose (also not shown in FIGS. 4 and 5). Another vacuum probe (not shown in FIGS. 4 and 5) is coupled to a vacuum gauge (also not shown), which measures the pressure inside the chamber defined by and disposed underneath the upper bagging film 16.

A cured silicone sheet stock (not shown in FIGS. 4 and 5) about 0.050" in thickness can be placed between the upper bagging film 16 and the strongback support tooling 14. The purpose of the silicone sheet stock is to prevent the outer bagging film (made of nylon) from being sucked into the vacuum chamber, and to also protect the outer bagging film from being punctured by the strongback tooling.

The embodiment shown in FIGS. 4 and 5 further comprises an inner bag assembly 8' similar to the lower bag assembly 8 depicted in FIG. 2, except that inner bag assembly 8' does not have an inner bagging film 18 and vacuum probes 28 and 28a. More specifically, inner bag assembly 8' comprises a perforated parting film, a bleeder ply, an unperforated parting film, a heat blanket and breather plies (arranged as seen in FIG. 2), none of which are shown in FIGS. 4 and 5.

FIG. 4 depicts the system during the first phase, with outer bladder 42 inflated by pressurized air received via a hose 46 that passes through an aperture in the strongback support tooling 14. The inflatable outer bladder 42 surrounds an inflatable inner bladder 44, which is also removably attached (e.g., by hook-and-loop fasteners) to strongback support tooling 14. The inner bladder is shown in a deflated state in FIG. 4.

The secondary stage of cure is performed while the inflatable inner bladder 44 is inflated (as seen in FIG. 5) with positive pressure. Vacuum pressure (e.g., 14.7 psi) is applied through the nylon bagging film 16 over the strongback support tooling 14. That is sufficient to react the load of the inner inflated bladder during the second stage of the repair cycle When inflated, the inner bladder 44 pushes against the strongback support tooling and exerts pressure on the repair material (i.e., patch) 6 and heat blanket assembly. The inner bladder 44 is inflated by pressurized air received via a hose 48 that passes through an aperture in the strongback support tooling 14. Using an inflatable inner bladder eliminates the need for the internal vacuum bag system shown in FIG. 1 and may provide an additional benefit as a pressure intensifier for repair consolidation.

Alternatively, additional pressure can be applied to the repair patch 6 by using a compressible solid (e.g., wax) instead of an inflatable inner bladder. The compressible solid is disposed such that it only contacts the repair patch area. This will concentrate the pressure applied by the strongback support tooling 14 to the much smaller area of the repair patch 6.

Each embodiment of the DVD composite repair system disclosed herein comprises a heat blanket, a thermocouple system, a temperature controller, vacuum control valves and conventional bagging materials. These components are well known in the field of off-aircraft composite repairs and are used in the on-aircraft repair methods disclosed herein in a conventional manner.

One embodiment of the process flow for DVD repairs using the embodiment depicted in FIGS. 4 and 5 would use the same steps (1) through (13) as were performed for the embodiment depicted in FIGS. 1-3. The process flow would then continue as follows:

(14) remove the breather material and temporary vacuum bag (the polyester scrim is not removed and becomes part of the repair, while the parting film can stay in place and be reused during the debulking phase);

(15) prepare an assembly comprising a bleeder ply, a solid parting film, a heat blanket and breather plies (as previously described with reference to FIG. 3), stacked in sequence over the perforated parting film and underlying repair plies, the assembly further comprising four thermocouples placed around the perimeter of the repair plies to measure temperature;

(16) prepare the DVD upper bag assembly 10' as depicted in FIG. 4, centering it over the lower assembly 8' and sealing the upper bagging film 16 to the parent structure;

(17) inflate the outer bladder 42 (e.g., 40 psi), while leaving the inner bladder 44 deflated;

(18) apply a vacuum to the upper bag (14.7 psi), which vacuum pressure is maintained throughout the debulking and curing phases described below;

(19) heat the heat blanket to a soak temperature of 220°±10° F. at a ramp rate of 3°±1° F./min and then subject the part to the soak temperature for a dwell time of 30(±5) minutes;

(20) inflate the inner bladder 44 (e.g., 18 psi to provide a slight mechanical pressure advantage), while maintaining the soak temperature and inflation of the outer bladder 42 for another 30(+5/−0) minutes;

(21) inflate the outer bladder 42 to 30 psi and the inner bladder 44 to 14.7 psi for final cure;

(22) for a patch having 35 plies or less, heat the heat blanket from the soak temperature at a ramp rate of 1° to 3° F./min up to a final cure temperature of 350°±15° F., and then hold at that temperature for 150-180 minutes to achieve full cure;

(23) allow the repair site to cool at a rate no greater than 5° F./min;

(24) remove the upper and lower assemblies; and

(25) perform surface finishing as necessary

A prototype portable DVD bladder and strongback system of the type depicted in FIGS. 4 and 5 was produced and then tested on repair panels. Metal Bond 1515 adhesive was used in these trials. The processing parameters for this test were as follows. There were two stages in the initial DVD debulk cycle. Initially, the heat blanket was heated to 220° F. at a 3 degree per minute ramp rate and the part was subjected to a 30-minute dwell under vacuum (stage 1). During this first stage, the outer bladder was inflated to 40 psi while the inner bladder was not inflated. In the second stage, the inner bladder was inflated to 14.7 psi, and the temperature of the heat blanket was held at 220° F. for another 30 minutes. After the debulk cycle, the final cure cycle was initiated. For final cure, the outer bladder was inflated to 30 psi and the inner bladder was inflated—it reached 18 psi (a slight mechanical pressure advantage) During this final stage, the heat blanket was heated from 220° F. at a ramp rate of 3 degrees per minute up to 355° F. The repair site was held at that temperature and vacuum pressure (14.7 psi) for 120 minutes to achieve full cure. (The inner bag pressure required periodic monitoring as the air heated up to ensure that the pressure did not increase enough to cause the outer nylon bag to suck below the outer bladder and cause the vacuum bag to fail.) The heat blanket was then ramped down to ambient temperature at a rate of 5 degrees per minute. At this point the cure was complete.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. For example, the outer bladder 42 shown in FIG. 4 could be substituted for the solid spacer 12 shown in FIG. 1. Therefore it is intended that the invention not be limited to the particular embodiment disclosed as the best mode contemplated for carrying out this invention.

The invention claimed is:

1. A method for in-situ repair of a site on a parent structure, comprising the following steps:
   (a) placing a stack of repair plies made of composite material in a position overlying the site;
   (b) placing a heat blanket in a position above the stack of repair plies;
   (c) supporting a first inflatable bladder in a position above the heat blanket;
   (d) sealing a vacuum bag to the parent structure along a perimeter surrounding the site, a central portion of the vacuum bag being disposed in a position above the first inflatable bladder;
   (e) evacuating the vacuum bag;
   (f) heating the heat blanket to a temperature within a range of debulking soak temperatures;
   (g) maintaining the temperature within the range of debulking soak temperatures for a first dwell time while the vacuum bag is evacuated and the first inflatable bladder is deflated, thereby drawing gases from the stack of repair plies;
   (h) after the first dwell time has transpired, inflating the first inflatable bladder to exert a first pressure on the stack of repair plies;
   (i) maintaining the temperature within the range of debulking soak temperatures for a second dwell time while the vacuum bag is evacuated and the first inflatable bladder is inflated;
   (j) after the second dwell time has transpired, heating the heat blanket to a temperature within a range of final cure temperatures and inflating the first inflatable bladder to exert a second pressure on the stack of repair plies; and
   (k) while the vacuum bag is evacuated and the first inflatable bladder is inflated, maintaining the temperature within the range of final cure temperatures for a time sufficient to achieve final curing of the composite material of the repair plies and hot bonding of the repair plies to the site on the parent structure.

2. The method as recited in claim 1, wherein step (c) comprises:
   attaching a second inflatable bladder to a perimetral portion of a strongback support tool, said first inflatable bladder being disposed under a central portion of the strongback support tool and within the second inflatable bladder; and
   inflating the second inflatable bladder to a third pressure before the first inflatable bladder is inflated to the first pressure.

3. The method as recited in claim 2, wherein step (j) further comprises inflating the second inflatable bladder to a fourth pressure less than the first pressure after the second dwell time.

4. The method as recited in claim 1, further comprising allowing the repair site to cool at a rate no greater than 5 degrees Fahrenheit per minute after full cure has been achieved.

5. The method as recited in claim 1, further comprising the following steps performed prior to step (a): applying a ply of perforated adhesive to the site; and compacting the adhesive by applying pressure.

6. The method as recited in claim 1, further comprising compacting the stack of repair plies after step (a) and prior to step (b).

7. The method as recited in claim 1, wherein said range of debulking soak temperatures is 220°±10° F.

8. The method as recited in claim 1, wherein said range of final cure temperatures is 350°±15° F.

9. A method for in-situ treatment of uncured composite material overlying a site on a parent structure made of cured composite material, comprising the following steps:
   (a) placing uncured composite material in a position overlying the site;
   (b) placing a heat blanket in a position above the uncured composite material;
   (c) placing a strongback support tool that supports first and second inflatable bladders in a position above the heat blanket, the first inflatable bladder being disposed between the heat blanket and the strongback support tool, and the second inflatable bladder surrounding a volume of space disposed between the parent structure and the strongback support tool;

(d) placing a vacuum bag over the strongback support tool;

(e) sealing a perimeter of the vacuum bag to a portion of the parent structure that surrounds the site;

(f) inflating the second inflatable bladder to a first pressure, the inflated second inflatable bladder being supported by the parent structure;

(g) evacuating the vacuum bag;

(h) heating the heat blanket to a temperature within a range of debulking soak temperatures; and (i) maintaining the temperature within the range of debulking soak temperatures for a first dwell time while the vacuum bag is evacuated, the first inflatable bladder is deflated and the second inflatable bladder is inflated, thereby drawing gases from the uncured composite material.

10. The method as recited in claim 9, further comprising:

(j) after the first dwell time has transpired, inflating the first inflatable bladder to a second pressure, the first inflatable bladder being configured to exert a pressure on the composite material when inflated to the second pressure; and (k) maintaining the temperature within the range of debulking soak temperatures for a second dwell time sufficient to consolidate the composite material while the vacuum bag is evacuated and the first and second inflatable bladders are inflated.

11. The method as recited in claim 10, further comprising:

(l) after the second dwell time has transpired, heating the heat blanket to a temperature within a range of final cure temperatures, inflating the first inflatable bladder to exert a third pressure less than the second pressure, and inflating the second inflatable bladder to exert a fourth pressure less than the first pressure; and (m) while the vacuum bag is evacuated and the first and second inflatable bladders are inflated, maintaining the temperature within the range of final cure temperatures for a time sufficient to achieve final curing of the composite material and hot bonding of the cured composite material to the site on the parent structure.

12. The method as recited in claim 11, further comprising monitoring the pressure inside the inflated first inflatable bladder during step (m).

13. The method as recited in claim 9, wherein the uncured composite material comprises a stack of repair plies.

14. The method as recited in claim 9, further comprising compacting the uncured composite material after step (a) and prior to step (b).

15. A method for in-situ treatment of uncured composite material overlying a site on a parent structure made of cured composite material, comprising the following steps:

(a) placing uncured composite material in a position overlying the site;

(b) placing a heat blanket in a position above the uncured composite material;

(c) attaching an inflatable bladder to a perimeter of a strongback support tool;

(d) placing the strongback support tool in a position where a central portion thereof overlies the heat blanket, the inflatable bladder surrounding a volume of space disposed between the parent structure and the strongback support tool;

(e) placing a vacuum bag over the strongback support tool;

(f) sealing a perimeter of the vacuum bag to a portion of the parent structure that surrounds the site;

(g) inflating the inflatable bladder to a first pressure while in a position whereat the inflated inflatable bladder will be supported by the parent structure;

(h) evacuating the vacuum bag;

(i) heating the heat blanket to a temperature within a range of debulking soak temperatures;

(j) maintaining the temperature within the range of debulking soak temperatures for a first dwell time while the vacuum bag is evacuated and the inflatable bladder is inflated, thereby drawing gases from the uncured composite material;

(k) after the first dwell time has transpired, exerting a pressure on the uncured composite material; and (l) maintaining the temperature within the range of debulking soak temperatures for a second dwell time sufficient to consolidate the composite material while the vacuum bag is evacuated, the inflatable bladder is inflated, and pressure is being exerted on the uncured composite material.

16. The method as recited in claim 15, wherein pressure is exerted on the uncured composite material by way of a second inflated inflatable bladder disposed between the strongback support tool and the heat blanket.

17. The method as recited in claim 15, wherein pressure is exerted on the uncured composite material by way of a compressible solid disposed between the strongback support tool and the heat blanket.

* * * * *